United States Patent
Lee

(10) Patent No.: US 10,096,170 B2
(45) Date of Patent: Oct. 9, 2018

(54) IMAGE DEVICE FOR DETERMINING AN INVALID DEPTH INFORMATION OF A DEPTH IMAGE AND OPERATION METHOD THEREOF

(71) Applicant: Etron Technology, Inc., Hsinchu (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 188 days.

(21) Appl. No.: 14/297,592

(22) Filed: Jun. 5, 2014

(65) Prior Publication Data

US 2014/0362179 A1    Dec. 11, 2014

Related U.S. Application Data

(60) Provisional application No. 61/831,620, filed on Jun. 6, 2013.

(51) Int. Cl.
*H04N 13/00* (2018.01)
*G06T 19/20* (2011.01)
*G06T 7/593* (2017.01)

(52) U.S. Cl.
CPC .............. *G06T 19/20* (2013.01); *G06T 7/593* (2017.01); *H04N 13/00* (2013.01); *H04N 2013/0081* (2013.01); *H04N 2213/003* (2013.01)

(58) Field of Classification Search
CPC ........... H04N 13/00; H04N 15/00; H04N 7/00
See application file for complete search history.

(56) References Cited

U.S. PATENT DOCUMENTS

| | | | |
|---|---|---|---|
| 2003/0235341 A1 | 12/2003 | Gokturk | |
| 2005/0180627 A1 | 8/2005 | Yang | |
| 2006/0056679 A1 | 3/2006 | Redert | |
| 2007/0024614 A1* | 2/2007 | Tam | G06T 7/0067 345/419 |
| 2009/0109490 A1* | 4/2009 | Lau | H04N 1/4055 358/3.06 |

(Continued)

OTHER PUBLICATIONS

Michael Van den Bergh et al., "Combining RGB and ToF cameras for real-time 3D hand gesture interaction", pp. 66-72, 2010 IEEE, 2010.

(Continued)

*Primary Examiner* — Maryam A Nasri
(74) *Attorney, Agent, or Firm* — Winston Hsu

(57) ABSTRACT

An image device for determining an invalid depth information of a depth image includes a first sensor, a second sensor, a pre-processing module, a depth map engine, and an error determination unit. The first sensor captures first images and the second sensor captures second images. The pre-processing module generates a reference image according to each first image of the first images and a target image corresponding to the reference image according to a second image of the second images. The depth map engine generates a first depth image according to the reference image and the target image. The error determination unit sets gray level values of pixels of invalid areas of the first depth image to be a predetermined value to generate a second depth image, wherein pixels of the second depth image with the predetermined value have the invalid depth information.

14 Claims, 3 Drawing Sheets

Partial pixels of the reference image are outside an image range of the each first image

(56) References Cited

U.S. PATENT DOCUMENTS

| | | |
|---|---|---|
| 2009/0324059 A1 | 12/2009 | Boughorbel |
| 2009/0324062 A1 | 12/2009 | Lim |
| 2010/0046837 A1 | 2/2010 | Boughorbel |
| 2010/0066811 A1* | 3/2010 | Chang ................ H04N 13/0025 348/43 |
| 2010/0183236 A1 | 7/2010 | Kang |
| 2012/0293488 A1 | 11/2012 | Niu |
| 2013/0141433 A1 | 6/2013 | Astrand |
| 2014/0146139 A1 | 5/2014 | Schwartz |
| 2014/0362179 A1* | 12/2014 | Lee ....................... G06T 7/0075 348/43 |

OTHER PUBLICATIONS

Mahmoud Elmezain et al., "Hand Gesture Recognition Based on Combined Features Extraction", World Academy of Science, Engineering and Technology, International Scholarly and Scientific Research & Innovation, pp. 822-827, vol. 3 Dec. 21, 2009.

Mahmoud Elmezain et al., "Improving Hand Gesture Recognition Using 3D Combined Features", 2009 Second International Conference on Machine Vision, pp. 128-132, 2010 IEEE, 2009.

Ouerhani et al., Computing Visual Attention from Scene Depth, 2000, pp. 375-378, IEEE.

\* cited by examiner

Partial pixels of the reference image are outside an image range of the each first image

IMAGE DEVICE FOR DETERMINING AN INVALID DEPTH INFORMATION OF A DEPTH IMAGE AND OPERATION METHOD THEREOF

CROSS REFERENCE TO RELATED APPLICATIONS

This application claims the benefit of U.S. Provisional Application No. 61/831,620, filed on Jun. 6, 2013 and entitled "Depth Map Post Process System," the contents of which are incorporated herein by reference.

BACKGROUND OF THE INVENTION

1. Field of the Invention

The present invention relates to an image device and an operation method thereof, and particularly to an image device and an operation method thereof that can determine invalid areas of a depth image, wherein pixels of the invalid areas of the depth image have invalid depth information.

2. Description of the Prior Art

A depth map can be generated according to a left eye image and a right eye image through a stereo matching method, wherein the left eye image and the right eye image are rectified images to meet an epipolar constrain, the rectified images have invalid areas which are outside an image range of the left eye image (or the right eye image), and image information of the invalid areas is independent from original non-rectified images. Further, invalid areas of the left eye image are different from invalid areas of the right eye image, so the depth map will have error depth information after the depth map is generated according to the left eye image and the right eye image through the stereo matching method.

Generally speaking, the prior art first magnifies the original non-rectified images, then rectifies the magnified original non-rectified images to generate the rectified images, and finally crops the invalid areas of the rectified images and shrinks sizes of the rectified images without the invalid areas to an expected size. Then, the prior art utilizes the rectified images without the invalid areas to generate a correct depth image. However, magnifying the original non-rectified images is more complicated for a system.

SUMMARY OF THE INVENTION

An embodiment provides an image device for determining an invalid depth information of a depth image. The image device includes a first sensor, a second sensor, a pre-processing module, a depth map engine, and an error determination unit, wherein the pre-processing module includes a synchronization unit, an image processor, and a rectifier. The first sensor captures first images and the second sensor captures second images. The pre-processing module is coupled to the first sensor and the second sensor, wherein the pre-processing module generates a reference image according to each first image of the first images and a target image corresponding to the reference image according to a second image of the second images, and sets gray level values of pixels of the reference image outside an image range of the each first image to be a first predetermined value to determine invalid areas of the reference image, wherein the second image corresponds to the each first image. The depth map engine is coupled to the pre-processing module, wherein the depth map engine generates a first depth image according to the reference image and the target image. The error determination unit is coupled to the pre-processing module and the depth map engine, wherein the error determination unit utilizes the invalid areas of the reference image to determine invalid areas of the first depth image, and sets gray level values of pixels of the invalid areas of the first depth image to be a second predetermined value to generate a second depth image, wherein pixels of the second depth image with the second predetermined value have the invalid depth information.

Another embodiment provides an operation method for determining an invalid depth information of a depth image, wherein the operation method is applied to an image device, the image device includes a first sensor, a second sensor, a pre-processing module, a depth map engine, and an error determination unit, and the pre-processing module includes a synchronization unit, an image processor, and a rectifier. The operation method includes the first sensor capturing first images and the second sensor capturing second images; the pre-processing module generating a reference image according to each first image of the first images and a target image corresponding to the reference image according to a second image of the second images; the pre-processing module setting gray level values of pixels of the reference image outside an image range of the each first image to be a first predetermined value to determine invalid areas of the reference image, wherein the second image corresponds to the each first image; the depth map engine generating a first depth image according to the reference image and the target image; the error determination unit utilizing the invalid areas of the reference image to determine invalid areas of the first depth image; and the error determination unit setting gray level values of pixels of the invalid areas of the first depth image to be a second predetermined value to generate a second depth image, wherein pixels of the second depth image with the second predetermined value have the invalid depth information.

The present invention provides an image device for determining an invalid depth information of a depth image and an operation method thereof. The image device and the operation method utilizes a first sensor to capture first images and a second sensor to capture second images; utilizes a pre-processing module to generate a reference image according to each first image of the first images and a target image corresponding to the reference image according to a second image of the second images, and to determine invalid areas of the reference image; utilizes a depth map engine to generate a first depth image according to the reference image and the target image; and utilizes an error determination unit to determine invalid areas of the first depth image according to the invalid areas of the reference image, and to generate a second depth image according to the invalid areas of the first depth image, wherein pixels of invalid areas of the second depth image have invalid depth information. Compared to the prior art, because the present invention only determines the invalid areas of the second depth image (that is, the present invention does not execute a magnifying operation to generate the depth map), the present invention can let a following application unit coupled to the image device neglect the invalid depth information of the pixels the invalid areas of the second depth image. Thus, the following application unit can reduce operation error therefore because the following application unit neglects the invalid depth information of the pixels the invalid areas of the second depth image. Further, the present invention does not execute the magnifying operation to generate the second depth map, so the present invention can also reduce power consumption.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
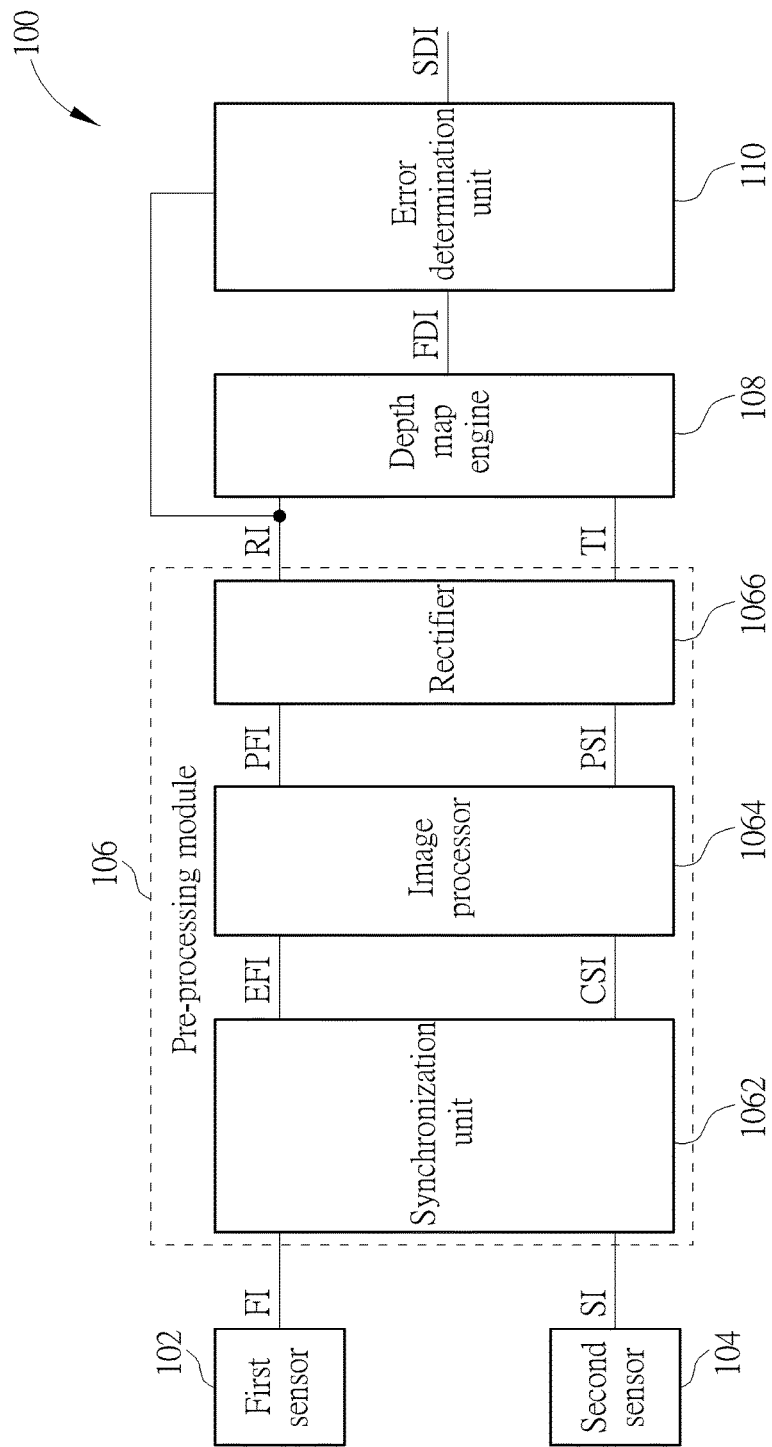
FIG. 1 is a diagram illustrating an image device for determining an invalid depth information of a depth image according to an embodiment.
Figure 2:
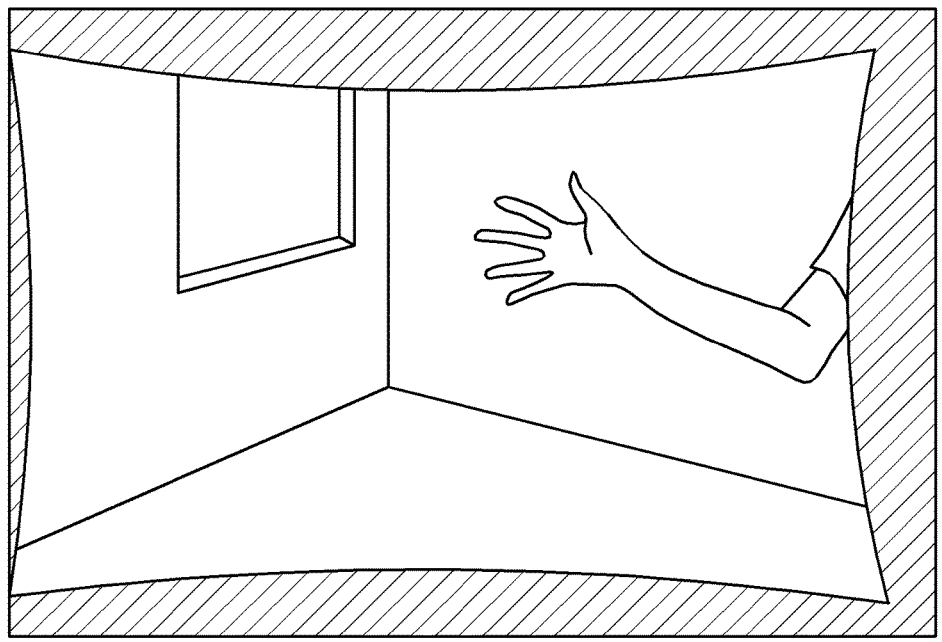
FIG. 2 is a diagram illustrating partial pixels of the reference image outside an image range of the each first image.
Figure 2:

Please refer to FIG. 1. FIG. 1 is a diagram illustrating an image device 100 for determining an invalid depth information of a depth image according to an embodiment. As shown in FIG. 1, the image device 100 includes a first sensor 102, a second sensor 104, a pre-processing module 106, a depth map engine 108, and an error determination unit 110, wherein the pre-processing module 106 includes a synchronization unit 1062, an image processor 1064, and a rectifier 1066. The first sensor 102 captures first images FI and the second sensor 104 captures second images SI after the image device 100 is powered on, wherein the first images FI are left eye images and the second images SI are right eye images, and the first images FI and the second images SI are gray level images. But, the present invention is not limited to the first images FI and the second images SI being gray level images. In another embodiment of the present invention, the first images FI and the second images SI are color images, or one of the first images FI and the second images SI is color image. As shown in FIG. 1, the synchronization unit 1062 is coupled to the first sensor 102 and the second sensor 104, the image processor 1064 is coupled to the synchronization unit 1062, and the rectifier 1066 is coupled to the image processor 1064. Because the first sensor 102 captures the first images FI and the second sensor 104 captures the second images SI after the image device 100 is powered on, the synchronization unit 1062 can simultaneously outputs each first image EFI of the first images FI and a corresponding second image CSI of the second images SI to the image processor 1064. The image processor 1064 executes an image processing on the each first image EFI and the corresponding second image CSI respectively to generate a processed first image PFI and a processed second image PSI after the image processor 1064 receives the each first image EFI and the corresponding second image CSI, wherein the image processing can be a combination of color space conversion, adjusting luminance, adjusting resolution, noise cancellation, edge enhancement, interpolation and adjusting contrast. After the rectifier 1066 receives the processed first image PFI and the processed second image PSI, the rectifier 1066 can execute a rectification processing on the processed first image PFI and the processed second image PSI respectively to generate a reference image RI and the target image TI, wherein the rectification processing is a coordinate transforming processing, the reference image RI and the target image TI meet an epipolar constrain, and the target image TI corresponds to the reference image RI. In addition, after the rectifier 1066 executes the rectification processing (the coordinate transforming processing) on the processed first image PFI to generate the reference image RI, partial pixels of the reference image RI are outside an image range of the each first image EFI (as shown in FIG. 2), so the rectifier 1066 further sets gray level values of the partial pixels of the reference image RI to be a first predetermined value (e.g. 0) to determine invalid areas of the reference image RI (wherein image information of the invalid areas of the reference image RI is independent from the each first image EFI). As shown in FIG. 1, the depth map engine 108 is coupled to the rectifier 1066 of the pre-processing module 106, and the error determination unit 110 is coupled to the rectifier 1066 of the pre-processing module 106 and the depth map engine 108. The depth map engine 108 can generate a first depth image FDI according to the reference image RI and the target image TI. After the error determination unit 110 receives the first depth image FDI, the error determination unit 110 utilizes the invalid areas of the reference image RI to determine invalid areas of the first depth image FDI. Although the gray level values of the invalid areas of the reference image RI has been set to be the first predetermined value, gray level values of pixels of the invalid areas of the first depth image FDI can be any value after the first depth image FDI is generated according to the reference image RI and the target image TI. Therefore, the error determination unit 110 sets the gray level values of the pixels of the invalid areas of the first depth image FDI to be a second predetermined value to generate a second depth image SDI, wherein pixels of the second depth image SDI with the second predetermined value (that is, pixels located on invalid areas of the second depth image SDI) have an invalid depth information, and the second predetermined value can be equal to or different from the first predetermined value. Thus, a following application unit (not shown in FIG. 1) coupled to the image device 100 can neglect the pixels of the second depth image SDI with the second predetermined value to reduce operation error.

Further, when gray level values of pixels of the reference image RI inside the image range of the each first image EFI are equal to the first predetermined value, the rectifier 1066 sets the gray level values of the pixels of the reference image RI inside the image range of the each first image EFI to be a third predetermined value, wherein the first predetermined value is different from the third predetermined value. Further, when the first images FI and the second images SI are not grey level images, the rectifier 1066 can set corresponding values of the partial pixels of the reference image RI to be corresponding predetermined values to determine the invalid areas of the reference image RI. For example, when the first images FI and the second images SI are color images, the rectifier 1066 can set R, G, B color values of the partial pixels of the reference image RI to be corresponding predetermined values to determine the invalid areas of the reference image RI.

Similarly, after the rectifier 1066 executes the rectification processing (the coordinate transforming processing) on the processed second image PSI to generate the target image TI, partial pixels of the target image TI are outside an image range of the corresponding second image CSI, so the rectifier 1066 further sets gray level values of the partial pixels of the target image TI to be the first predetermined value to determine invalid areas of the target image TI (wherein image information of the invalid areas of the target image TI is independent from the corresponding second image CSI).

Further, when gray level values of pixels of the target image TI inside the image range of the corresponding second image CSI are equal to the first predetermined value, the rectifier 1066 sets the gray level values of the pixels of the target image TI inside the image range of the corresponding second image CSI to be the third predetermined value. However, when the depth map engine 108 needs to generate a third depth image (corresponding to the target image TI), the rectifier 1066 just needs to determine the invalid areas of the target image TI, that is, when the depth map engine 108 only needs to generate the first depth image FDI (corresponding to the reference image RI), the rectifier 1066 is not necessary to determine the invalid areas of the target image TI. Therefore, after the third depth image is generated by the depth map engine 108, the error determination unit 110 can set the gray level values of the pixels of the invalid areas of the third depth image to be the second predetermined value to generate a fourth depth image (corresponding to the target image TI), wherein pixels of the fourth depth image with the second predetermined value (that is, pixels located on invalid areas of the fourth depth image) have an invalid depth information.

Further, the present invention is not limited to coupling sequence of the synchronization unit 1062, the image processor 1064, and the rectifier 1066 shown in FIG. 1. That is to say, positions of the synchronization unit 1062, the image processor 1064, and the rectifier 1066 shown in FIG. 1 can be changed arbitrarily, but the synchronization unit 1062, the image processor 1064, and the rectifier 1066 need to be located before the depth map engine 108 and after the first sensor 102 and the second sensor 104.

Figure 3:
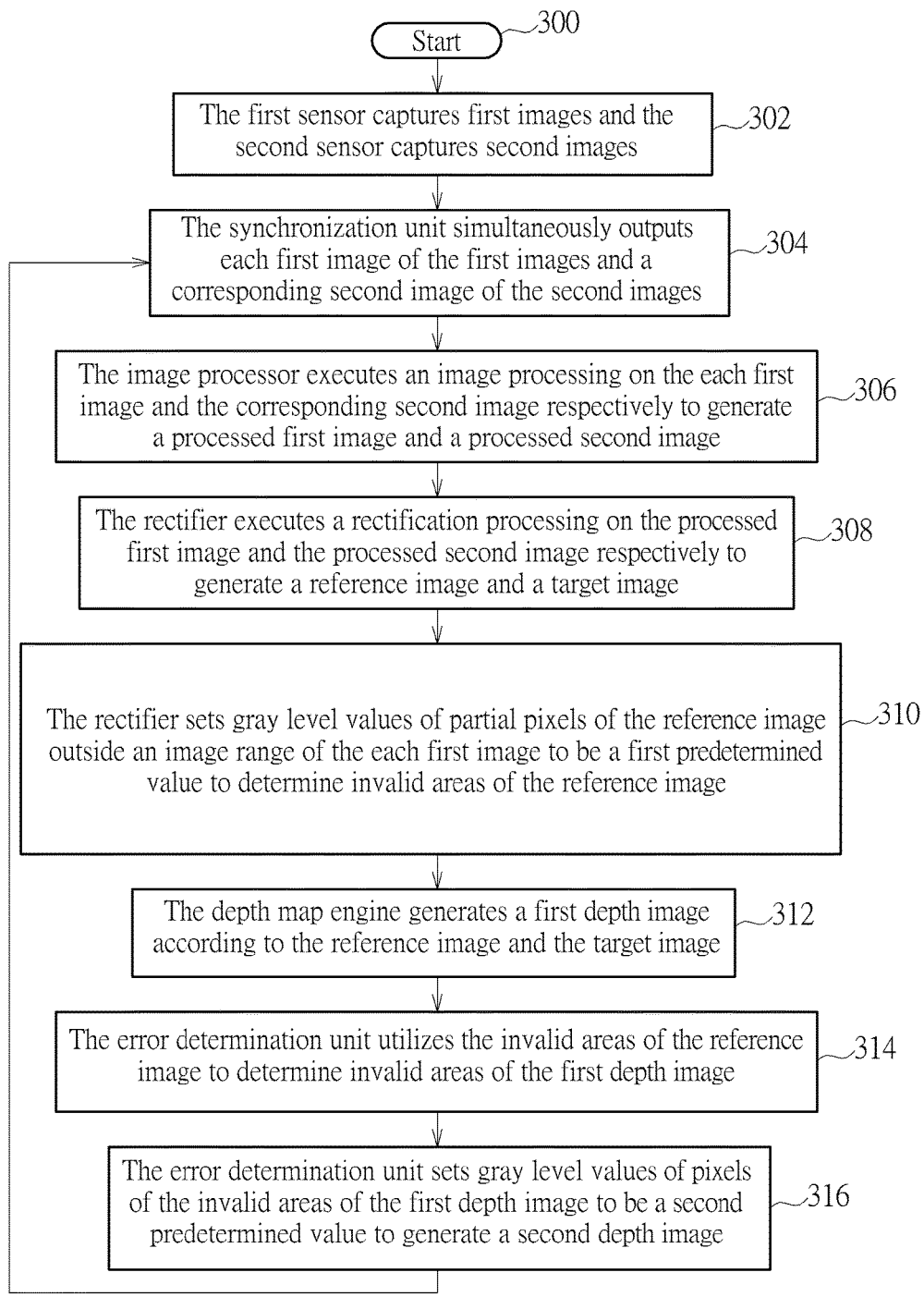
FIG. 3 is a flowchart illustrating an operation method for determining an invalid depth information of a depth image according to another embodiment.

Please refer to FIG. 1 to FIG. 3. FIG. 3 is a flowchart illustrating an operation method for determining an invalid depth information of a depth image according to another embodiment. The operation method in FIG. 3 is illustrated using the image device 100 in FIG. 1. Detailed steps are as follows:

Step 300: Start.

Step 302: The first sensor 102 captures first images FI and the second sensor 104 captures second images SI.

Step 304: The synchronization unit 1062 simultaneously outputs each first image EFI of the first images FI and a corresponding second image CSI of the second images SI.

Step 306: The image processor 1064 executes an image processing on the each first image EFI and the corresponding second image CSI respectively to generate a processed first image PFI and a processed second image PSI.

Step 308: The rectifier 1066 executes a rectification processing on the processed first image PFI and the processed second image PSI respectively to generate a reference image RI and a target image TI.

Step 310: The rectifier 1066 sets gray level values of partial pixels of the reference image RI outside an image range of the each first image EFI to be a first predetermined value to determine invalid areas of the reference image RI.

Step 312: The depth map engine 108 generates a first depth image FDI according to the reference image RI and the target image TI.

Step 314: The error determination unit 110 utilizes the invalid areas of the reference image RI to determine invalid areas of the first depth image FDI.

Step 316: The error determination unit 110 sets gray level values of pixels of the invalid areas of the first depth image FDI to be a second predetermined value to generate a second depth image SDI, go to Step 304.

As shown in FIG. 1, in Step 302, the first sensor 102 captures the first images FI and the second sensor 104 captures the second images SI after the image device 100 is powered on, wherein the first images FI are left eye images and the second images SI are right eye images, and the first images FI and the second images SI are gray level images. But, the present invention is not limited to the first images FI and the second images SI being gray level images. In another embodiment of the present invention, the first images FI and the second images SI are color images, or one of the first images FI and the second images SI is color image. In Step 304, because the first sensor 102 captures the first images FI and the second sensor 104 captures the second images SI after the image device 100 is powered on, the synchronization unit 1062 can simultaneously outputs the each first image EFI and the corresponding second image CSI to the image processor 1064. In Step 306, the image processing can be a combination of color space conversion, adjusting luminance, adjusting resolution, noise cancellation, edge enhancement, interpolation and adjusting contrast. In Step 308, the rectification processing is a coordinate transforming processing, the reference image RI and the target image TI meet an epipolar constrain, and the target image TI corresponds to the reference image RI. In Step 310, after the rectifier 1066 executes the rectification processing (the coordinate transforming processing) on the processed first image PFI to generate the reference image RI, the partial pixels of the reference image RI are outside the image range of the each first image EFI (as shown in FIG. 2), so the rectifier 1066 can set the gray level values of the partial pixels of the reference image RI to be the first predetermined value (e.g. 0) to determine the invalid areas of the reference image RI (wherein image information of the invalid areas of the reference image RI is independent from the each first image EFI). Further, when gray level values of pixels of the reference image RI inside the image range of the each first image EFI are equal to the first predetermined value, the rectifier 1066 sets the gray level values of the pixels of the reference image RI inside the image range of the each first image EFI to be a third predetermined value, wherein the first predetermined value is different the third predetermined value.

Similarly, after the rectifier 1066 executes the rectification processing (the coordinate transforming processing) on the processed second image PSI to generate the target image TI, the partial pixels of the target image TI are outside the image range of the corresponding second image CSI, so the rectifier 1066 can also set the gray level values of the partial pixels of the target image TI to be the first predetermined value to determine the invalid areas of the target image TI (wherein image information of the invalid areas of the target image TI is independent from the corresponding second image CSI). Further, when gray level values of pixels of the target image TI inside the image range of the corresponding second image CSI are equal to the first predetermined value, the rectifier 1066 sets the gray level values of the pixels of the target image TI inside the image range of the corresponding second image CSI to be the third predetermined value. However, when the depth map engine 108 needs to generate a third depth image (corresponding to the target image TI), the rectifier 1066 just needs to determine the invalid areas of the target image TI, that is, when the depth map engine 108 only needs to generate the first depth image FDI (corresponding to the reference image RI), the rectifier 1066 is not necessary to determine the invalid areas of the target image TI.

In Step 316, although the gray level values of the invalid areas of the reference image RI has been set to be the first predetermined value, the gray level values of the pixels of the invalid areas of the first depth image FDI may be any value after the first depth image FDI is generated according to the reference image RI and the target image TI. Therefore, the error determination unit 110 sets the gray level values of the pixels of the invalid areas of the first depth image FDI to be the second predetermined value to generate the second depth image SDI, wherein pixels of the second depth image SDI with the second predetermined value (that is, pixels located on invalid areas of the second depth image SDI) have an invalid depth information, and the second predetermined value can be equal to or different from the first predetermined value. Thus, a following application unit (not shown in FIG. 1) coupled to the image device 100 can neglect the pixels of the second depth image SDI with the second predetermined value to reduce operation error.

To sum up, the image device and the operation method provided by the present invention utilizes the first sensor to capture first images and the second sensor to capture second images; utilizes the pre-processing module to generate a reference image according to each first image of the first images and a target image corresponding to the reference image according to a second image of the second images, and to determine invalid areas of the reference image; utilizes the depth map engine to generate a first depth image according to the reference image and the target image; and utilizes the error determination unit to determine invalid areas of the first depth image according to the invalid areas of the reference image, and to generate a second depth image according to the invalid areas of the first depth image, wherein pixels of invalid areas of the second depth image have invalid depth information. Compared to the prior art, because the present invention only determines the invalid areas of the second depth image (that is, the present invention does not execute a magnifying operation to generate the second depth map), the present invention can let the following application unit coupled to the image device neglect the invalid depth information of the pixels the invalid areas of the second depth image. Thus, the following application unit can reduce operation error because the following application unit neglects the invalid depth information of the pixels the invalid areas of the second depth image. Further, the present invention does not execute the magnifying operation to generate the second depth map, so the present invention can also reduce power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image device for determining an invalid depth information of a depth image, the image device comprising:
    a first sensor capturing first images;
    a second sensor capturing second images;
    a pre-processor coupled to the first sensor and the second sensor, wherein the pre-processor generates a reference image according to each first image of the first images and a target image corresponding to the reference image according to a second image of the second images, defines invalid areas of the reference image according to an image range of the each first image, the invalid areas of the reference image are located outside the image range of the each first image, sets a first predetermined gray level value to pixels of the invalid areas of the reference image, and the second image corresponds to the each first image;
    a depth map generation circuit coupled to the pre-processor, wherein the depth map generation circuit generates a first depth image according to the reference image and the target image; and
    an error determination circuit coupled to the pre-processor and the depth map generation circuit, wherein the error determination circuit defines invalid areas of the first depth image according to the invalid areas of the reference image, and sets a second predetermined gray level value to pixels of the invalid areas of the first depth image to define invalid areas of a second depth image, wherein the invalid areas of the second depth image are neglected.

2. The image device of claim 1, wherein the pre-processor comprises:
    a synchronization circuit coupled to the first sensor and the second sensor, wherein the synchronization circuit simultaneously outputs the each first image and the second image;
    an image processor coupled to the synchronization circuit, wherein the image processor executes an image processing on the each first image and the second image respectively to generate a processed first image and a processed second image; and
    a rectifier coupled to the image processor, wherein the rectifier executes a rectification processing on the processed first image and the processed second image respectively to generate the reference image and the target image, and sets the first predetermined gray level value to the pixels of the invalid areas of the reference image.

3. The image device of claim 2, wherein the image processing is a combination of color space conversion, adjusting luminance, adjusting resolution, noise cancellation, edge enhancement, interpolation and adjusting contrast.

4. The image device of claim 2, wherein the rectification processing is a coordinate transforming processing, and the reference image and the target image meet an epipolar constrain.

5. The image device of claim 1, wherein the first images are left eye images and the second images are right eye images.

6. The image device of claim 1, wherein the first images and the second images are color images or gray level images.

7. The image device of claim 1, wherein when gray level values of pixels of the reference image inside the image range of the each first image are equal to the first predetermined gray level value, the gray level values of the pixels of the reference image inside the image range of the each first image are set to be a third predetermined gray level value, wherein the first predetermined gray level value is different from the third predetermined gray level value.

8. An operation method for determining an invalid depth information of a depth image, wherein the operation method is applied to an image device, the image device comprises a first sensor, a second sensor, a pre-processor, a depth map generation circuit, and an error determination circuit, and the pre-processor comprises a synchronization circuit, an image processor, and a rectifier, the operation method comprising:
    the first sensor capturing first images and the second sensor capturing second images;
    the pre-processor generating a reference image according to each first image of the first images and a target image corresponding to the reference image according to a second image of the second images;

the pre-processor defining invalid areas of the reference image according to an image range of the each first image, wherein the invalid areas of the reference image are located outside the image range of the each first image;

the depth map generation circuit generating a first depth image according to the reference image and the target image;

the error determination circuit defining invalid areas of the first depth image according to the invalid areas of the reference image; and the error determination circuit setting a second predetermined gray level value to pixels of the invalid areas of the first depth image to define invalid areas of a second depth image, wherein the invalid areas of the second depth image are neglected.

9. The operation method of claim 8, wherein the pre-processor generating the reference image and the target image, and determining the invalid areas of the reference image comprises:

the synchronization circuit simultaneously outputting the each first image and the second image;

the image processor executing an image processing on the each first image and the second image respectively to generate a processed first image and a processed second image; and the rectifier executing a rectification processing on the processed first image and the processed second image respectively to generate the reference image and the target image, and setting the first predetermined gray level value to the pixels of the invalid areas of the reference image.

10. The operation method of claim 9, wherein the image processing comprises a combination of color space conversion, adjusting luminance, adjusting resolution, noise cancellation, edge enhancement, interpolation and adjusting contrast.

11. The operation method of claim 9, wherein the rectification processing is a coordinate transforming processing, and the reference image and the target image meet an epipolar constrain.

12. The operation method of claim 8, wherein the first images are left eye images and the second images are right eye images.

13. The operation method of claim 8, wherein the first images and the second images are color images or gray level images.

14. The operation method of claim 8, wherein when gray level values of pixels of the reference image inside the image range of the each first image are equal to the first predetermined gray level value, the gray level values of the pixels of the reference image inside the image range of the each first image are set to be a third predetermined gray level value, wherein the first predetermined gray level value is different from the third predetermined gray level value.

* * * * *